United States Patent
Kim et al.

(10) Patent No.: US 7,502,342 B2
(45) Date of Patent: Mar. 10, 2009

(54) RESYNCHRONIZATION METHOD IN WIRELESS AD-HOC NETWORK ENVIRONMENTS

(75) Inventors: Dae-ung Kim, Seoul (KR); Na-yeon Kim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 751 days.

(21) Appl. No.: 10/778,240

(22) Filed: Feb. 17, 2004

(65) Prior Publication Data
US 2004/0179488 A1    Sep. 16, 2004

(30) Foreign Application Priority Data
Mar. 13, 2003    (KR) .................. 10-2003-0015737

(51) Int. Cl.
*H04B 7/212* (2006.01)
(52) U.S. Cl. .................. 370/324; 370/400; 370/503; 455/41.2; 455/502; 455/507
(58) Field of Classification Search .................. 370/324, 370/400, 503; 455/41.2, 502, 507
See application file for complete search history.

(56) References Cited

U.S. PATENT DOCUMENTS

| 6,397,260 | B1 * | 5/2002 | Wils et al. ................. 709/238 |
| 2002/0055978 | A1 * | 5/2002 | Joon-Bo et al. ............. 709/209 |
| 2002/0116460 | A1 * | 8/2002 | Treister et al. .............. 709/204 |
| 2003/0036350 | A1 * | 2/2003 | Jonsson et al. ............... 455/41 |
| 2004/0203378 | A1 * | 10/2004 | Powers ...................... 455/41.2 |

FOREIGN PATENT DOCUMENTS

| EP | 1176762 | | 1/2002 |
| JP | 11239138 | A | 8/1999 |
| JP | 2002223217 | A | 8/2002 |
| KR | 2002-0009283 | A | 2/2002 |
| WO | 9704614 | | 2/1997 |

OTHER PUBLICATIONS

Japanese Office Action dated Aug. 30, 2006 issued in Japanese Patent Application No. 2004-71928.
Davis, W. L., "A Mac Layer submission for the High Rate 802.15.3 Standard" Project: IEEE P802.15 Working Group for Wireless Personal Area Networks (WPANS), Sep. 2000, pp. 1-39.

* cited by examiner

*Primary Examiner*—Barry W Taylor
(74) *Attorney, Agent, or Firm*—Sughrue Mion, PLLC

(57) ABSTRACT

A resynchronization method for wireless ad-hoc network environments that are synchronized by a synchronization signal broadcast from one arbiter includes (a) preparing a candidate arbiters list that lists the wireless access devices linked to a wireless ad-hoc network that are capable of becoming candidate arbiters; (b) sending the candidate arbiters list to the wireless access devices of the wireless ad-hoc network; and (c) broadcasting the synchronization signal by a wireless access device selected as a new arbiter based on the candidate arbiters list, if the synchronization signal is not broadcast for a predetermined timeout period. Accordingly, if an arbiter stops its operations in the wireless ad-hoc network, the resynchronization is rapidly performed by the most suitable wireless access device.

6 Claims, 6 Drawing Sheets

| BEACON GENERATION TIMEOUT | LAST | |
|---|---|---|
| DEVICE IDENTIFIER | PRIORITY | 1 |
| DEVICE IDENTIFIER | PRIORITY | 2 |
| | | ⋮ |
| DEVICE IDENTIFIER | PRIORITY | N |

FIG. 3

| BEACON GENERATION TIMEOUT | LAST | |
|---|---|---|
| DEVICE IDENTIFIER | PRIORITY | 1 |
| DEVICE IDENTIFIER | PRIORITY | 2 |
| ⋮ | ⋮ | ⋮ |
| DEVICE IDENTIFIER | PRIORITY | N |

RESYNCHRONIZATION METHOD IN WIRELESS AD-HOC NETWORK ENVIRONMENTS

CROSS-REFERENCE TO RELATED APPLICATIONS

This application claims the benefit of Korean Patent Application No. 10-2003-0015737 filed Mar. 13, 2003, in the Korean Intellectual Property Office, the disclosure of which is incorporated herein by reference.

BACKGROUND

1. Field of the Invention

A method consistent with the present invention relates to a resynchronization method in wireless ad-hoc network environments, and more particularly, to a resynchronization method for performing a resynchronization process in a case that an arbiter for synchronizing a wireless ad-hoc network environment stops its operations.

2. Description of the Related Art

A wireless ad-hoc network environment is synchronized by a wireless access device operating as an arbiter. For example, in the Institute of Electrical and Electronic Engineers (IEEE) 802.11 standard, all wireless access devices connected to the wireless ad-hoc network environment can be arbiters synchronizing the wireless ad-hoc network environment every beacon frame by using a backoff scheme. Further, in the 802.15.3 standard, only one arbiter exists while the wireless ad-hoc network environment is maintained, and beacon frames issued in the same periods by an arbiter are broadcast to and synchronize each wireless access device.

Accordingly, the 802.11 standard is not suitable for isochronous services since the beacon frame synchronizing the wireless ad-hoc network environment is not issued in the same periods. However, even though a wireless access device operating as an arbiter stops its operations due to, for example, sudden malfunctions, the ad-hoc network environment can be synchronized by another wireless access device since all wireless access devices connected to the wireless ad-hoc environment can be an arbiter.

Whereas the 802.15.3 standard has advantages for isochronous services since the environment is synchronized by beacon frames broadcasting in the same intervals from one arbiter. However, the synchronization is carried out by one arbiter, so that, if the arbiter stops its operations due to, for example, occurrences of situations such as power outages or the like, a new arbiter should be selected since the wireless ad-hoc network environment is not synchronized, and a resynchronization process should be performed by the newly selected arbiter.

As in the 802.15.3 standard, a resynchronization process by a newly selected arbiter in the wireless ad-hoc network environment for which one arbiter exists is generally as follows. That is, if a current arbiter stops its operations so that a situation occurs wherein beacon frames are not broadcast for a certain period of time, the wireless access devices temporarily stop their transmission and reception operations. The wireless access devices wait for an arbitrarily set period of time and each issues a beacon frame, and, at this time, a wireless access device that first issues a beacon frame becomes a new arbiter. Thereafter, in a process configuring the wireless ad-hoc network environment, the current arbiter is handed over to another arbiter according to the attributes of a wireless access device to be connected.

However, in the above scheme, each wireless access device itself issues a beacon frame after waiting for an arbitrarily set period of time from the time when its transmission and reception operations are halted with beacon frame broadcasts stopped, causing a problem that a resynchronization can be delayed by contentions between wireless access devices if the wireless access devices each have the same period of time arbitrarily set. Further, it cannot be guaranteed that the most suitable arbiter is selected in a resynchronization process, so that an arbiter may be handed over later, which causes a problem of incurring an overhead in wireless ad-hoc network environments.

SUMMARY

The present invention has been devised to solve at least the above problems, and it is an exemplary aspect of the present invention to provide a resynchronization method for enabling the most suitable wireless access device to rapidly perform a resynchronization process if an arbiter stops its operations in a wireless ad-hoc network environment that is synchronized by one arbiter.

Consistent with the above exemplary aspect, a resynchronization method in a wireless ad-hoc network environment that is synchronized by a synchronization signal broadcast from one arbiter comprises the steps of (a) preparing a candidate arbiters list that lists wireless access devices capable of becoming candidate arbiters out of a plurality of wireless access devices linked to a wireless ad-hoc network; (b) sending the candidate arbiters list to the plurality of wireless access devices; and (c) broadcasting the synchronization signal by a wireless access device selected, based on the candidate arbiters list, as a new arbiter, if the synchronization signal is not broadcast for a predetermined timeout period.

Preferably, but not necessarily, step (a) includes the steps of searching by the arbiter for wireless access devices capable of becoming the candidate arbiters out of the plurality of wireless access devices; and setting priorities among the wireless access devices searched for as the candidate arbiters, and preparing the candidate arbiters list. At this time, the search step may be carried out through a data communication process between the arbiter and the plurality of wireless access devices within a period of a beacon frame used as the synchronization signal.

Preferably, but not necessarily, in step (b), the candidate arbiters list is sent through the beacon frame used as the synchronization signal. Further, it is preferable, but not necessary, that, in step (c), the new arbiter is sequentially selected based on the priorities set in the candidate arbiters list. Further, preferably, but not necessarily, if all the wireless access devices listed in the candidate arbiters list do not become the new arbiter, a wireless access device firstly broadcasting the synchronization signal, after a predetermined waiting time period lapses, becomes the new arbiter.

BRIEF DESCRIPTION OF THE DRAWINGS

The invention will be described in detail with reference to the following drawings in which like reference numerals refer to like elements, and wherein:

FIG. 3 is a view for showing an exemplary list of candidate arbiters;

DETAILED DESCRIPTION OF AN ILLUSTRATIVE

Non-Limiting Embodiment

Hereinafter, the present invention will be described in detail with reference to the accompanying drawings.

Figure 1:
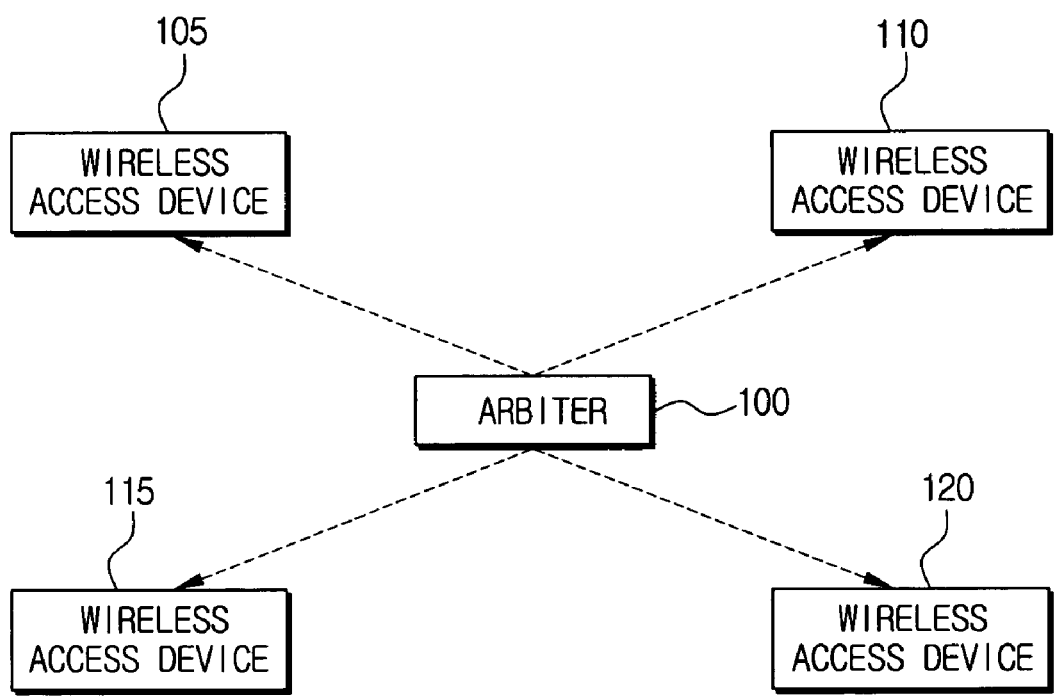
FIG. 1 is a view for explaining a network environment to which a resynchronization method is applied in a wireless ad-hoc network according to an illustrative, non-limiting embodiment of the present invention.

FIG. 1 is a view for explaining a network environment to which a resynchronization method is applied in a wireless ad-hoc network according to an illustrative embodiment of the present invention. Referring to FIG. 1, the wireless ad-hoc network environment consists of one arbiter 100 and plural wireless access devices 105, 110, 115, and 120. The arbiter 100 broadcasts beacon frames that are used as a synchronization signal to the plural wireless access devices 105, 110, 115, and 120, to thereby synchronize the wireless ad-hoc network. In FIG. 1, only four wireless access devices 105, 110, 115, and 120 are shown for the sake of explanation, but more wireless access devices may be provided to construct the wireless ad-hoc network.

Figure 2:
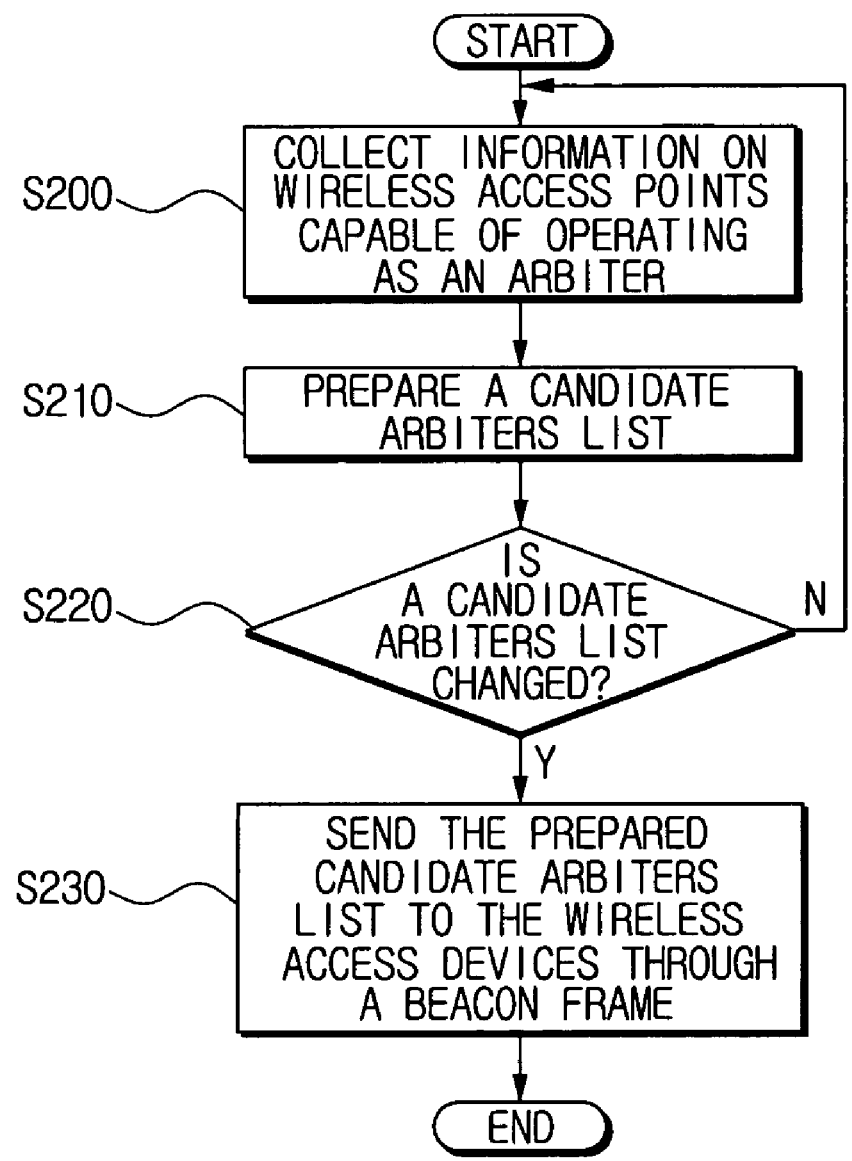
FIG. 2 is a flow chart for showing a process for listing candidate arbiters.

FIG. 2 is a flow chart for showing a process for listing candidate arbiters in a resynchronization method in a wireless ad-hoc network according to an illustrative embodiment of the present invention.

Referring to FIG. 2, for plural wireless access devices linked to the current network, a current arbiter collects information on the wireless access devices capable of being a new arbiter in a case that the current arbiter stops its operations (S200). Such information can be collected during the connections of the current arbiter to the plural wireless access devices within a beacon frame transmission period, or collected upon a special request of the current arbiter. The arbiter prepares a candidate arbiters list that lists candidate arbiters capable of being a new arbiter and their priorities based on the collected information (S210).

FIG. 3 shows an exemplary candidate arbiters list prepared by an arbiter. Referring to FIG. 3, the candidate arbiters list prepared by an arbiter has a BEACON GENERATION TIMEOUT field, a LAST field, n number of DEVICE IDENTIFIER fields, and n PRIORITY fields. In here, the BEACON GENERATION TIMEOUT field temporarily stores a time for which a wireless access device selected as a candidate arbiter waits if a current arbiter stops its operations. If a beacon frame is not broadcast within this time, a wireless access device having a highest priority out of the candidate arbiters broadcasts a beacon frame.

The LAST field stores the total number of wireless access devices selected as candidate arbiters. The DEVICE IDENTIFIER fields store identifiers assigned when wireless access devices selected as candidate arbiters connect to the wireless ad-hoc network environment, and the PRIORITY fields store priorities for the corresponding candidate arbiters. The order in which a wireless access device becomes an arbiter is sequentially determined for an arbiter based on the priorities stored in the PRIORITY fields, with the highest priority being a priority of '0'.

If such a candidate arbiters list is prepared, the list is compared to a previously prepared candidate arbiters list, and it is decided whether there are changed entries between the compared lists (S220). As a result of the decision, if there is no changed entry in the candidate arbiters list, the steps S200 to S220 are repeated. Unlike the above, if there are changed entries, the prepared candidate arbiters list is sent to the plural wireless access devices through a beacon frame (S230). Through such a process, each wireless access device receives a candidate arbiters list which is periodically updated.

Figure 4:
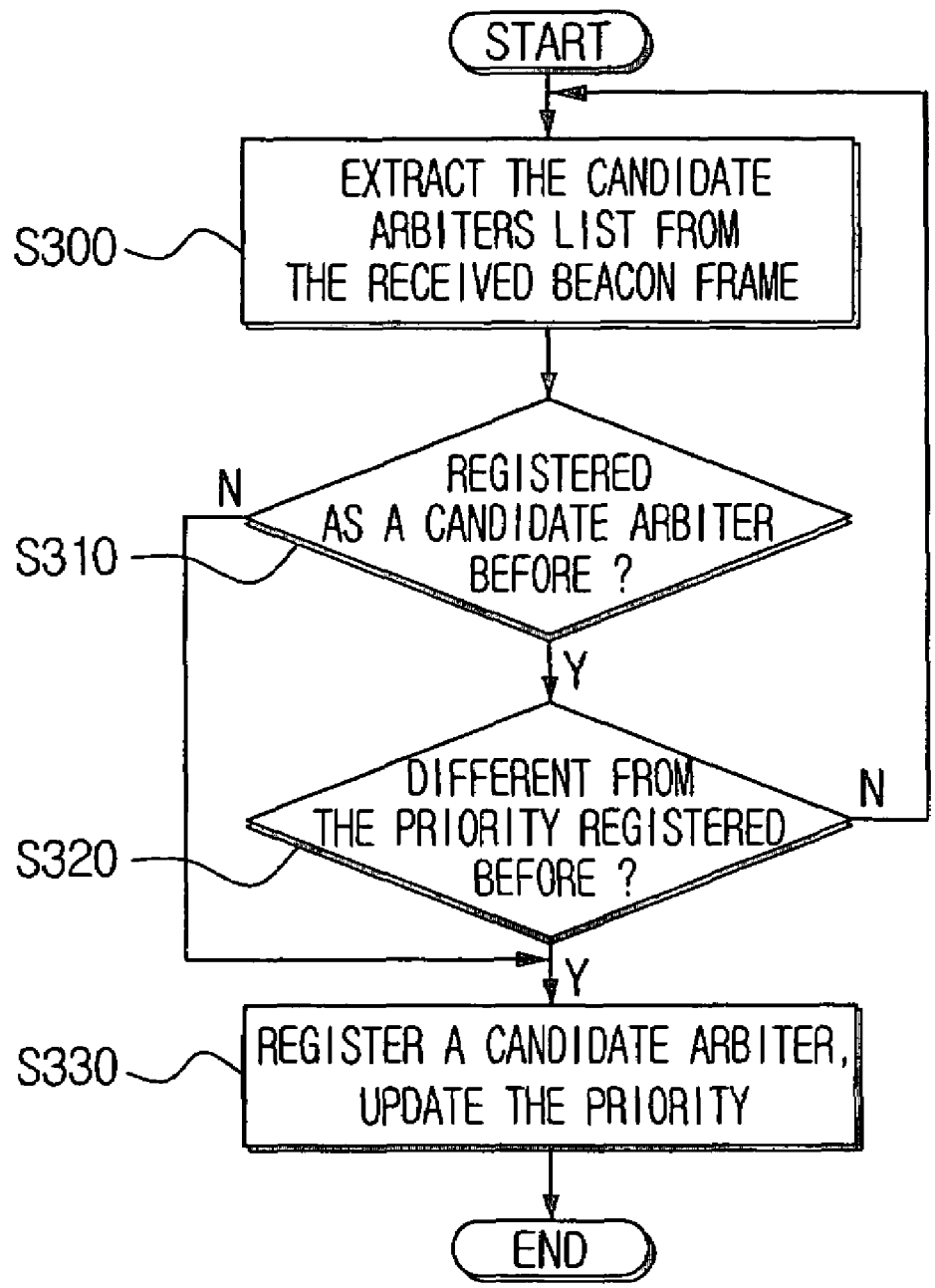
FIG. 4 is a flow chart for showing operations of wireless access devices selected as candidate arbiters.

FIG. 4 is a flow chart for showing operations of wireless access devices selected as candidate arbiters. Referring to the FIG. 4, each wireless access device extracts a candidate arbiters list from the received beacon frame (S300). If the candidate arbiters list is completely extracted by a wireless access device, it is decided whether the wireless access device itself has been registered as a candidate arbiter before (S310), and, if the wireless access device itself is selected as a new candidate arbiter, the wireless access device registers itself as a candidate arbiter (S330) so as to carry out a resynchronization process, which will be described later, in circumstances that a new arbiter becomes necessary. Unlike the above, if the wireless access device itself was selected as a candidate arbiter before, the wireless access device decides whether its priority has changed (S320), and, if its priority has changed, the wireless access device changes its priority to a changed priority, and, if there is no change in its priority, the wireless access device repeats the steps starting with the step S300.

Figure 5:
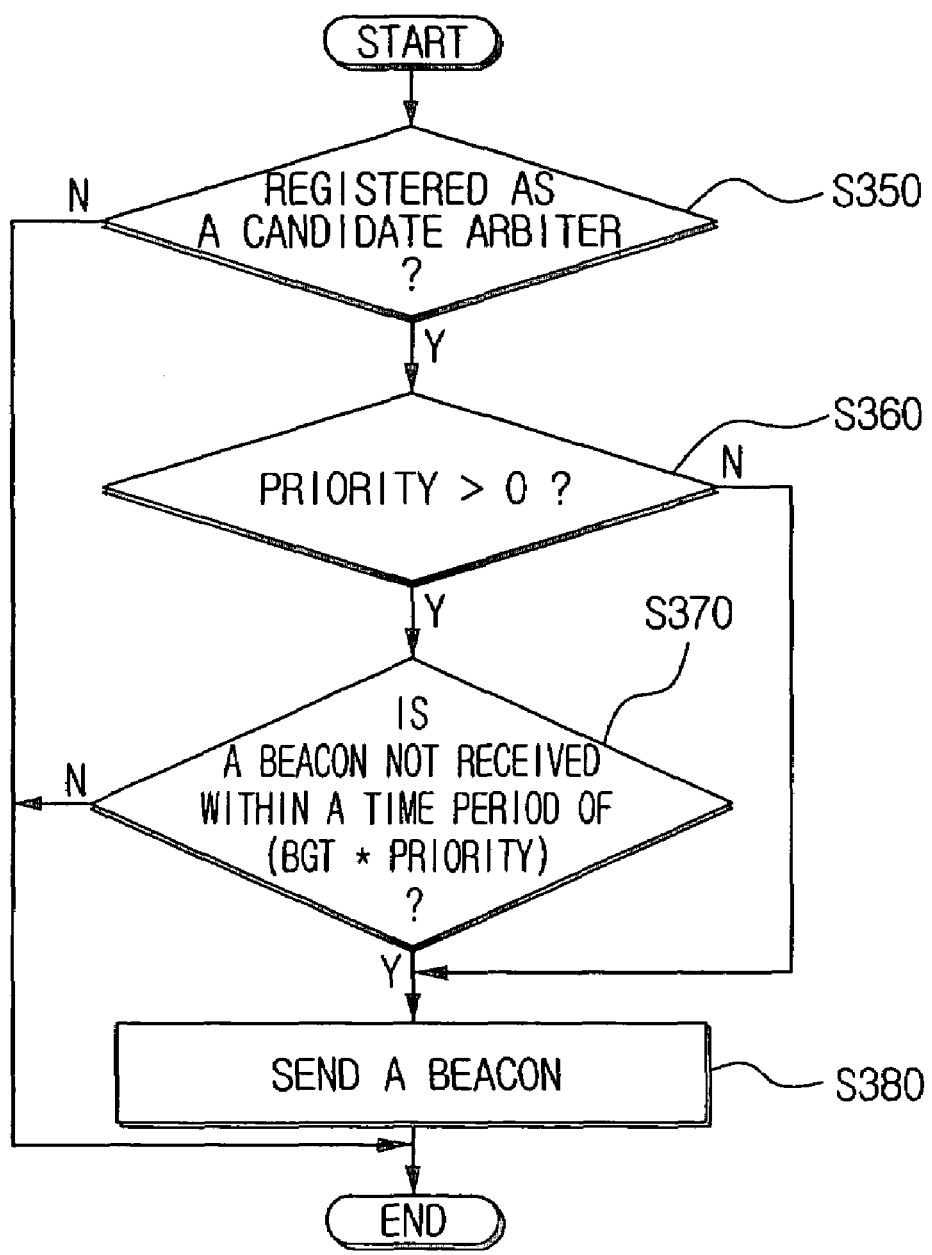
FIG. 5 is a flow chart for showing a resynchronization method when an arbiter stops its operations.
Figure 6A:
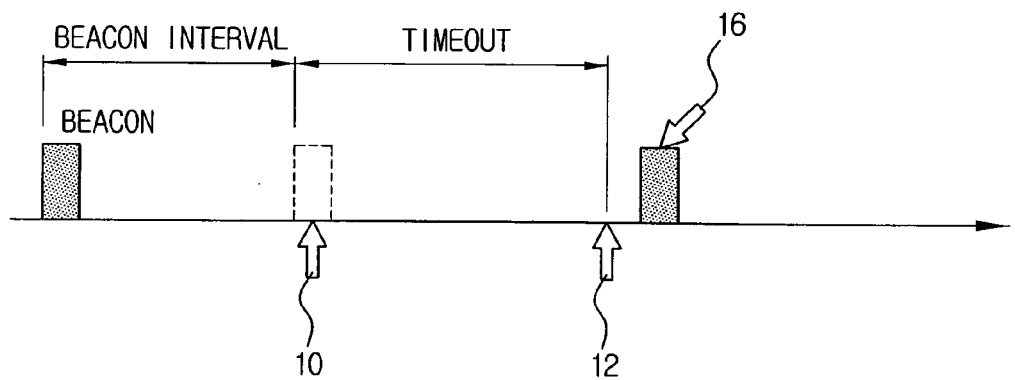
FIGS. 6A and 6B are views for explaining the flow chart of FIG. 5.
Figure 6B:
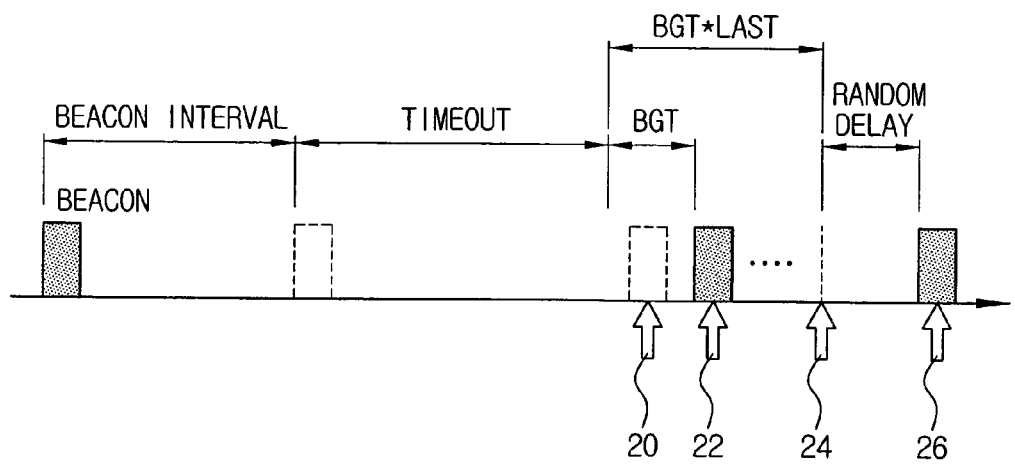

FIG. 5 is a flow chart for showing a resynchronization process in a case that an arbiter stops its operations, and FIG. 6A and FIG. 6B are views for explaining the resynchronization process of FIG. 5.

Referring to FIG. 5, each wireless access device, if a situation occurs wherein a beacon frame that has been broadcast at a certain beacon interval is not received for a predetermined timeout period, decides whether the wireless access device itself is registered as a candidate arbiter (S350). As a result of the decision, the wireless access device stops a resynchronization process if the wireless access device itself is not registered as a candidate arbiter, and, if the wireless access device itself is registered as a candidate arbiter, the wireless access device decides whether it has a priority higher than the priority of '0' (S360). If the wireless access device has the priority of '0', corresponding to the highest priority, the wireless access device sends a beacon and becomes a new arbiter (S380).

Such a process is shown in FIG. 6A. In FIG. 6A, a time denoted by reference numeral 10 indicates a time that a current arbiter stops broadcasting a beacon with its operations halted, and reference numeral 12 denotes a time that a predetermined timeout period lapses from the time 10. After the timeout period lapses, a candidate arbiter having the highest priority among the candidate arbiters becomes a new arbiter and sends a beacon denoted by reference numeral 16.

In the meantime, if its priority is larger than '0', the wireless access device decides whether a beacon sent from a new arbiter is received within a time period of (BGT*priority) (S370). Here, BGT stands for a Beacon Generation Timeout, which denotes a time scheduled for every wireless access device selected as a candidate arbiter to generate and send a beacon, as shown in FIG. 6B. Accordingly, if a situation occurs that a candidate arbiter having the priority of '0' does not become a new arbiter due to certain circumstances, a candidate arbiter having a subsequent (lower) priority, that is, the priority of '1', becomes a new arbiter, sending a beacon after a time period of BGT*1=BGT, and such a process sequentially continues with wireless access devices having subsequent priorities until a new arbiter is selected.

In FIG. 6B, a time denoted by reference numeral 20 indicates a time scheduled for the wireless access device having the priority of '0' to send a beacon, and a time denoted by reference numeral 22 shows a state in which a wireless access device having the priority of '1' sends a beacon. If the wireless access device having the priority of '1' does not send a beacon, a wireless access device having a subsequent priority sends a beacon.

Further, if a situation occurs in which all the wireless access devices selected as candidate arbiters do not send a beacon, a wireless access device that first sends a beacon denoted by reference numeral 26, after an arbitrary waiting time, becomes a new arbiter as in the existing method, after a time period of the total number of candidate arbiters LAST times BGT, that is, after a time period of BGT*LAST lapses, as denoted by reference numeral 24.

Through such a process, a wireless access device having a subsequent priority rapidly becomes a new arbiter if an arbiter stops its operations.

As described above, the present invention enables the most suitable wireless access device to rapidly perform a resynchronization when an arbiter stops its operations in a wireless ad-hoc network environment. Further, the present invention can select the most suitable wireless access device as an arbiter in advance, to thereby reduce the occasions that an arbiter is handed over during configuring of the wireless ad-hoc network environment. Further still, the present invention can select plural candidate arbiters so as to enable a wireless access device having a subsequent priority to operate as an arbiter for a stable resynchronization, if a selected wireless access device having a particular priority does not operate as an arbiter.

The invention has been shown and described with reference to an illustrative, non-limiting embodiment thereof, and it will be understood by those skilled in the art that various changes in form and details may be made therein without departing from the spirit and scope of the invention as defined by the appended claims.

What is claimed is:

1. A resynchronization method in a wireless ad-hoc network that is synchronized by a synchronization signal broadcast from one arbiter, comprises:
    (a) preparing a candidate arbiters list, from a plurality of wireless access devices linked to the wireless ad-hoc network, that lists the wireless access devices capable of becoming candidate arbiters;
    (b) sending the candidate arbiters list to each of the plurality of wireless access devices; and
    (c) broadcasting the synchronization signal by the wireless access device selected based on the candidate arbiters list as a new arbiter, if the synchronization signal is not broadcast for a predetermined timeout period;
    wherein, in step (c), the new arbiter is sequentially selected based on one or more priorities, set in the candidate arbiters list, corresponding to the wireless access devices capable of becoming candidate arbiters,
    wherein step (a) comprises:
    (a1) searching by the arbiter for the wireless access devices capable of becoming the candidate arbiters out of the plurality of wireless access devices;
    (a2) setting one or more priorities among the wireless access devices identified as the candidate arbiters; and
    (a3) preparing the candidate arbiters list.

2. The resynchronization method as claimed in claim 1, wherein step (a1) is carried out through a data communication process between the arbiter and the plurality of wireless access devices within a period of a beacon frame used as the synchronization signal.

3. A resynchronization method in a wireless ad-hoc network that is synchronized by a synchronization signal broadcast from one arbiter, comprises:
    (a) preparing a candidate arbiters list, from a plurality of wireless access devices linked to the wireless ad-hoc network, that lists the wireless access devices capable of becoming candidate arbiters;
    (b) sending the candidate arbiters list to each of the plurality of wireless access devices; and
    (c) broadcasting the synchronization signal by the wireless access device selected based on the candidate arbiters list as a new arbiter, if the synchronization signal is not broadcast for a predetermined timeout period;
    wherein, in step (c), the new arbiter is sequentially selected based on one or more priorities, set in the candidate arbiters list, corresponding to the wireless access devices capable of becoming candidate arbiters,
    wherein, if all of the wireless access devices listed in the candidate arbiters list do not become the new arbiter, a wireless access device broadcasting the synchronization signal for the first time, after a predetermined waiting time period lapses, becomes the new arbiter.

4. A computer readable recording medium having embodied thereon a computer program for executing a resynchronization method in a wireless ad-hoc network that is synchronized by a synchronization signal broadcast from one arbiter, comprising:
    (a) preparing a candidate arbiters list, from a plurality of wireless access devices linked to the wireless ad-hoc network, that lists the wireless access devices capable of becoming candidate arbiters
    (b) sending the candidate arbiters list to each of the plurality of wireless access devices; and
    (c) broadcasting the synchronization signal by the wireless access device selected based on the candidate arbiters list as a new arbiter, if the synchronization signal is not broadcast for a predetermined timeout period;
    wherein, in step (c), the new arbiter is sequentially selected based on one or more priorities, set in the candidate arbiters list, corresponding to the wireless access devices capable of becoming candidate arbiters,
    wherein step (a) comprises:
    (a1) searching by the arbiter for the wireless access devices capable of becoming the candidate arbiters out of the plurality of wireless access devices;
    (a2) setting one or more priorities among the wireless access devices identified as the candidate arbiters; and
    (a3) preparing the candidate arbiters list.

5. The computer readable recording medium of claim 4, wherein step (a1) is carried out through a data communication process between the arbiter and the plurality of wireless access devices within a period of a beacon frame used as the synchronization signal.

6. A computer readable recording medium having embodied thereon a computer program for executing a resynchronization method in a wireless ad-hoc network that is synchronized by a synchronization signal broadcast from one arbiter, comprising:
    (a) preparing a candidate arbiters list, from a plurality of wireless access devices linked to the wireless ad-hoc network, that lists the wireless access devices capable of becoming candidate arbiters
    (b) sending the candidate arbiters list to each of the plurality of wireless access devices; and
    (c) broadcasting the synchronization signal by the wireless access device selected based on the candidate arbiters list as a new arbiter, if the synchronization signal is not broadcast for a predetermined timeout period;

wherein, in step (c), the new arbiter is sequentially selected based on one or more priorities, set in the candidate arbiters list, corresponding to the wireless access devices capable of becoming candidate arbiters, wherein, if all of the wireless access devices listed in the candidate arbiters list do not become the new arbiter, a wireless access device broadcasting the synchronization signal for the first time, after a predetermined waiting time period lapses, becomes the new arbiter.

* * * * *